United States Patent

[11] 3,587,336

[72] Inventor Charles Benjamin Peak
     Geneseo, Ill.
[21] Appl. No. 867,673
[22] Filed Oct. 20, 1969
[45] Patented June 28, 1971
[73] Assignee Deere & Company, Moline, Ill.

[54] BELT DRIVE MECHANISM
     8 Claims, 3 Drawing Figs.
[52] U.S. Cl. ................................................. 74/242.11
[51] Int. Cl. ..................................................... F16h 7/12
[50] Field of Search........................................... 74/242.11
         (R), 242.11 (C), 242.11 (P), 242.15

[56] References Cited
     UNITED STATES PATENTS
     899,741   9/1908   Lane et al. ..................... 74/242.11
     2,995,380 8/1961   King ............................. 74/242.11X
     3,515,010 6/1970   Wagstaff et al. ............... 74/242.15X Primary Examiner—Leonard H. Gerin
Attorneys—H. Vincent Harsha, Harold M. Knoth, William A. Murray and John M. Nolan ABSTRACT: A belt drive mechanism for connecting a driven sheave mounted forwardly on a combine with a straw chopper drive sheave mounted rearwardly thereon, including a first drivebelt connecting the straw chopper drive sheave with an intermediate sheave mounted on a swingable arm forwardly on the combine, and a second drivebelt connecting the intermediate sheave with the driven sheave. A spring-loaded idler device applies tension directly to the first belt and indirectly to the second belt through the swingably mounted intermediate sheave, and a lost-motion connection between the idler device and the swingable arm mounting the intermediate sheave applies tension directly to the second belt when the first belt is removed from the mechanism.

PATENTED JUN28 1971 3,587,336

*INVENTOR.*
CHARLES B. PEAK

3,587,336

BELT DRIVE MECHANISM

BACKGROUND OF THE INVENTION

The present invention relates generally to power transmission means, and more particularly to a two-belt, series drive having a single device for applying tension to either both belts or to the single remaining belt when the other is removed.

The modern harvesting machine or combine conventionally includes a number of separate belt drive systems for transmitting power to its various components from a single, forwardly mounted power source. It is advantageous to employ a two-belt drive for some components, whereby one belt is used to drive an intermediate sheave from the power source and a second belt is used to drive the component from the intermediate sheave. Such a two-belt drive system is conventionally utilized, for example, to power a straw chopper attachment mounted on the extreme rear portion of the combine, due to the great distance between the attachment and the forwardly mounted power source.

It is highly desirable in a two-belt system to devise means whereby the proper running tension can be applied to both belts of the system through the medium of a single tensioning device, thereby reducing both the cost and complexity of the machine. The component drive mechanism disclosed in copending U.S. application Ser. No. 773,007, filed 4 Nov. 1968, provides such a means utilizing an intermediate sheave mounted on a swingable arm for transferring the tension imparted in one belt by a spring-loaded idler sheave to the other belt. Although that particular drive system has a number of advantageous applications, it is unsuitable for use with a combine straw chopper attachment since it is operable only when both belts are employed in the system. It is often necessary to remove the straw chopper attachment and thus the straw chopper drive belt from the combine, as, for example, when it is desired to bale the straw in a particular field, or when harvesting certain crops, such as corn. Although the front belt is rendered unnecessary when the straw chopper is removed, it is desirable to leave that belt in the system since its removal is normally a difficult and time-consuming operation. However, since the drive system disclosed in copending U.S. application Ser. No. 773,007 is operable only when both belts are in use, the application of that system to a straw chopper drive would necessitate the addition of a separate tensioning device for the front belt, which addition would destroy the advantage otherwise resulting from use of the system. The single tensioning device utilized in application Ser. No. 773,007 cannot be mounted to operate in conjunction with the front belt due to space limitations on the combine.

SUMMARY OF THE INVENTION

It is accordingly an object of the present invention to provide a two-belt drive system utilizing a single tensioning device for both belts, from which one of the belts can be removed without releasing the tension in the remaining belt. The drive system of the present invention includes, generally, an input sheave driven by a power source, an output or component drive sheave, and a double-grooved intermediate sheave mounted on a shiftable shaft intermediate the two aforesaid sheaves. A first drivebelt connects the component drive sheave with one groove in the intermediate sheave, while a second drivebelt connects the other groove in the intermediate sheave with the input sheave. A tensioning device in the form of a spring-loaded idler sheave mounted on a swingable arm is provided to deflect and thereby tension the first drive belt, the tension in that belt being transmitted to the second belt through the shiftable shaft mounting the intermediate sheave. When the first drivebelt is removed from the system, a lost-motion link connecting the swingable arm mounting the idler sheave and the shiftable intermediate shaft acts to spring load the shiftable shaft, thereby tensioning the remaining drivebelt.

DESCRIPTION OF THE PREFERRED EMBODIMENT

Figure 1:
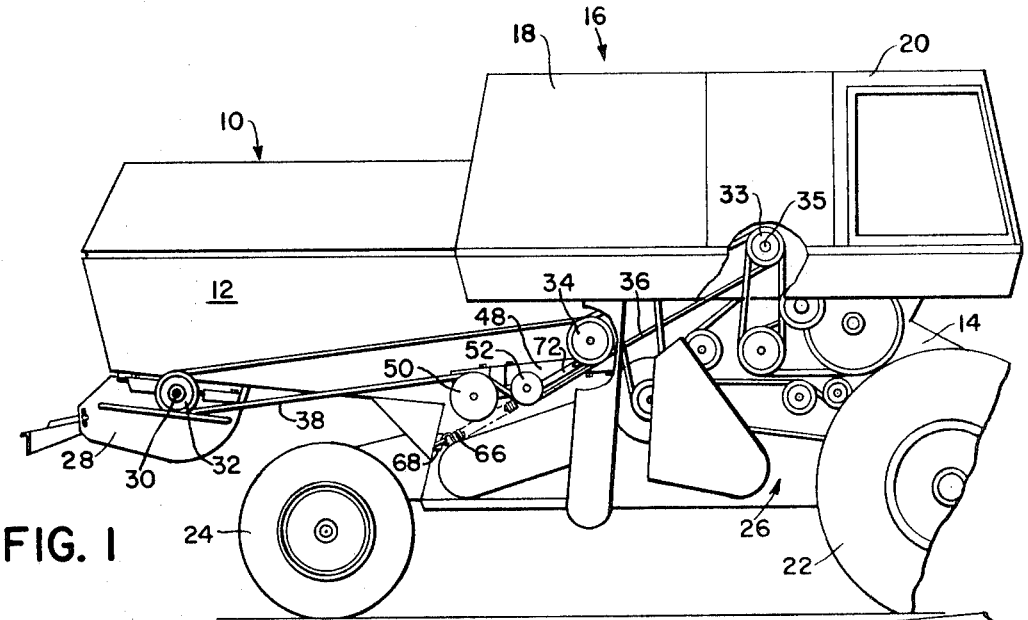
FIG. 1 is a side view of a self-propelled combine embodying the present invention, with portions of the combine broken away to more clearly show the invention.

The invention is embodied in a self-propelled combine having a main separator body 10 with upright sidewall 12, a forwardly extending feeder house, only part of which is shown at 14, and an upper compartment 16 housing a grain tank located generally at 18 and a power source or internal combustion engine located generally at 20. The combine conventionally has a pair of front drive wheels 22 and a pair of rear steerable wheels 24. A number of belt drive systems, connecting the main power source with the various driven components of the combine, are situated adjacent the forward portion of the separator wall 12 and designated generally by the reference numeral 26.

Mounted rearwardly on the main separator body is a straw chopper attachment 28. After having been separated from the grain and transported to the rear of the separator body, the straw is passed into the straw chopper which chops it into small particles and distributes it on the ground behind the combine. The straw chopper attachment 28 is mounted on the separator body 10 for easy removal since it is often desired to operate the combine without the chopper attachment.

The straw chopper includes a drive shaft 30 driven by a drive sheave 32 mounted on the end of the shaft at the side of the attachment adjacent the separator body sidewall 12. Power is supplied to the chopper attachment from a main drive sheave 33 mounted forwardly on the combine on transverse shaft 35. The shaft 35 is, in turn, drivingly connected to the forwardly mounted internal combustion engine 20. The power is transmitted from the sheave 33 through an intermediate, double-grooved sheave 34 mounted adjacent the sidewall 12 between the main drive sheave and the straw chopper 28, thence to the straw chopper drive sheave 32. A forward drive belt 36 (only part of which is shown) connects one groove of the double-grooved intermediate sheave 34 with the forwardly mounted main drive sheave. A rear drive belt 38 connects the other groove of the sheave 34 with the straw chopper drive sheave 32.

Figure 2:
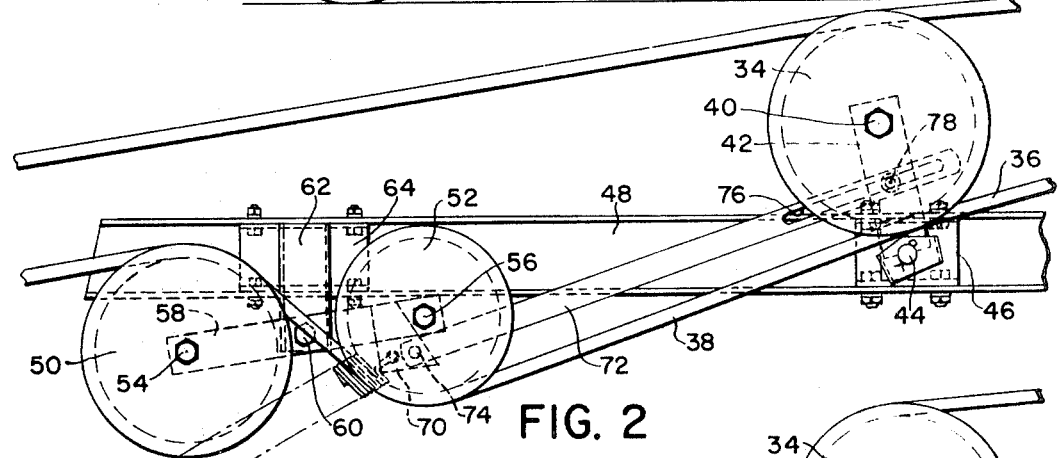
FIG. 2 is an enlarged fragmentary view of the drive system of the present invention with both belts in place.
Figure 3:
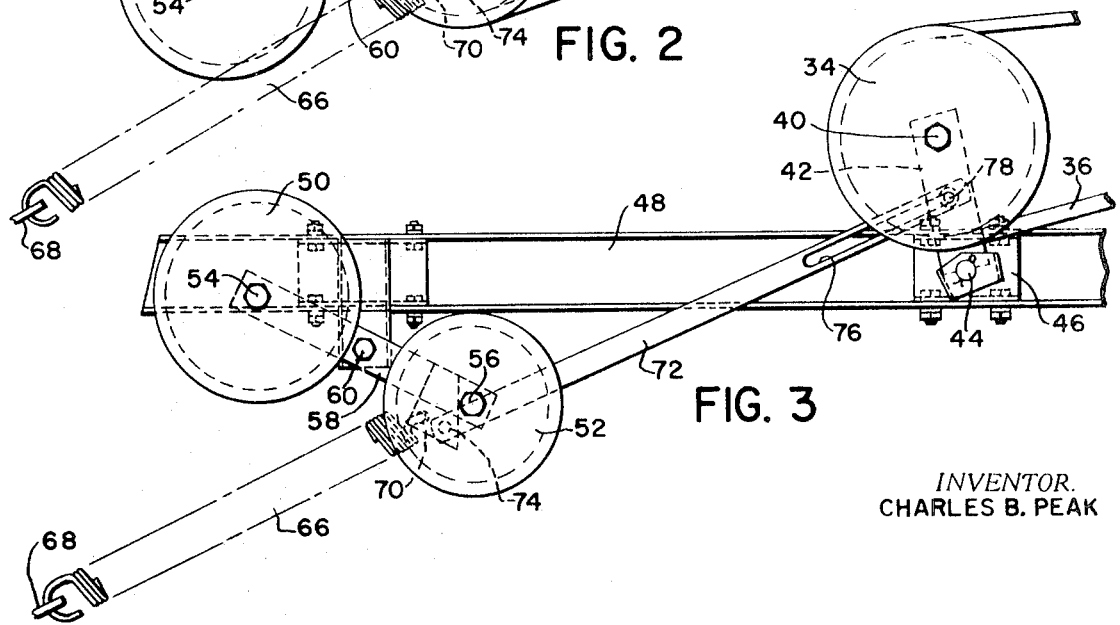
FIG. 3 is an enlarged fragmentary view similar to FIG. 2, with one of the drivebelts removed.

The manner in which the intermediate sheave 34 is mounted in the drive mechanism is illustrated in detail in FIGS. 2 and 3. As shown therein, the sheave 34 is mounted for rotation about a pin 40, which, in turn, is fixed to the upper end of an arm 42. The arm 42 is swingably mounted on a pivot 44 on bracket 46, which, in turn, is rigidly secured to a support member 48 on the separator body sidewall 12. A pair of idler sheaves 50 and 52 are rotatably carried by pins 54 and 56, respectively, on opposite ends of an arm 58. The arm 58 is swingable about a pin 60 fixed to the lower end of a support arm 62, which, in turn, is rigidly secured to a bracket 64 on the member 48. As is apparent from the drawings, the sheaves 50 and 52 are adapted to engage the opposite sides of the belt 38. The pivot 60 is located on the arm 58 intermediate the two idler sheaves 50 and 52 so that rotation of the arm in a counterclockwise direction, as viewed in FIG. 2, moves the idler sheaves away from belt 38, while rotation of the arm in a clockwise direction moves the sheaves toward belt 38, increasing the deflection and thereby the tension in the belt. The arm 58 is biased for clockwise rotation by means of spring 66, extending between a bracket 68 fixed to the sidewall 12, and a bracket 70 fixed to the forward end of the arm 58.

It is apparent from the structure described that the tension introduced in the rear belt 38 by the idler sheave device is transmitted to the front belt 36 through the swingably mounted intermediate sheave 34. When the straw chopper attachment 28 and the rear belt 38 are removed from the combine, however, a link member 72, connecting the swingable arms 58 and 42, serves to transmit the biasing force of the spring 66 to the intermediate sheave 34 and thus tension belt 36. The rearward end of the link 72 is pivotally mounted at 74 to the bracket 70 on arm 58, while the forward end of the link is provided with an elongated slot 76 which is slidably received by a pin 78 on the arm 42. As shown in FIG. 2, when both belts are employed in the drive system, the link 72 is normally disposed so that pin 78 is received in the middle portion of the slot 76, thus forming a lost-motion connection between the two members. When the rear belt 38 is removed from the system, as shown in FIG. 3, the arm 58, carrying idler sheaves 50 and 52, is free to rotate under the urging of spring 66 until the forward end of slot 76 in the link 72 contacts pin 78. When the belt 38 is removed, the biasing force of the spring 66 is thus transferred directly through link 72 to the intermediate sheave 34, which serves to maintain the proper running tension in the front belt 36.

I claim:

1. A drive mechanism comprising first and second pulley means mounted in spaced relation, intermediate pulley means mounted between said first and second pulley means for movement in a direction normal to the axis of rotation of said intermediate pulley means, a first endless flexible drive element drivingly connecting said first pulley means and said intermediate pulley means, a second endless flexible drive element drivingly connecting said second pulley means and said intermediate pulley means, and tensioning means for applying tension to said first and second endless flexible drive elements, said tensioning means including idler means mounted adjacent said first flexible drive element for movement toward and away from said element, biasing means operatively associated with said idler means to bias said idler means toward said first flexible drive element, and means operatively connecting said biasing means and said intermediate pulley means for transmitting the biasing force of said biasing means to said intermediate pulley means toward said second endless flexible drive element, when said first endless flexible drive element is removed from the drive mechanism.

2. The invention defined in claim 1 wherein the endless flexible elements are drivebelts and the pulley means are in the form of sheave means adapted to drivingly engage said belts.

3. The invention defined in claim 1 wherein the means connecting said biasing means to said intermediate pulley means comprises lost-motion link means.

4. The invention defined in claim 1 wherein the intermediate pulley means is mounted on a first swingable arm, said idler means is mounted on a second swingable arm, and said means operatively connecting said biasing means and said intermediate pulley means comprises lost-motion link means connecting said first and second swingable arms.

5. The invention defined in claim 4 wherein the biasing means comprises spring means.

6. The invention defined in claim 4 wherein the endless flexible elements are drivebelts and the pulley means are in the form of sheave means adapted to drivingly engage said belts.

7. The invention defined in claim 4 wherein the idler means comprises a pair of pulley means engageable with said first endless flexible drive element, one of said pulley means being mounted on each end of said second swingable arm.

8. In a combine having a main separator body with an upright sidewall, a straw chopper or the like mounted rearwardly on said separator body and having a drive sheave disposed adjacent the upright sidewall, and a power driven sheave disposed forwardly on the combine, the combination therewith of an improved belt drive means for drivingly connecting said straw chopper drive sheave and said power driven sheave, said belt drive means comprising: intermediate sheave means mounted between the two aforesaid sheaves adjacent the upright sidewall on a first swingable arm for movement in a direction normal to the axis of rotation of said intermediate sheave means, a first drive belt drivingly connecting said straw chopper drive sheave and said intermediate sheave means, a second drive belt drivingly connecting said power driven sheave and said intermediate sheave means, and tensioning means for applying tension to said first and second drivebelts, said tensioning means including idler means mounted adjacent said first drivebelt on a second swingable arm for movement in a direction toward and away from said first drivebelt, biasing means operatively associated with said idler means to bias said idler means toward said first drivebelt, and lost-motion link means connecting said first and second swingable arms for transmitting the biasing force of said biasing means to said intermediate sheave means, thereby biasing said intermediate sheave means toward said second drivebelt, when said first drivebelt is removed from the belt drive means.

UNITED STATES PATENT OFFICE
CERTIFICATE OF CORRECTION

Patent No. 3,587,336           Dated    28 June 1971

Inventor(s)          Charles B. Peak

It is certified that error appears in the above-identified patent and that said Letters Patent are hereby corrected as shown below:

Col. 3, line 38, after "means" add -- , thereby biasing said intermediate pulley means --; line 42, change "drivebelts" to -- drive belts --.

Col. 4, line 1, change "to" to -- and --; after "means" add -- for transmitting the biasing force of said biasing means to said intermediate pulley means --; lines 12 and 33, change "drivebelts" to -- drive belts --; lines 35, 36, 38, 42, and 43, change "drivebelt" to -- drive belt --.

Signed and sealed this 11th day of January 1972.

(SEAL)
Attest:

EDWARD M. FLETCHER, JR.
Attesting Officer

ROBERT GOTTSCHALK
Acting Commissioner of Patents